United States Patent
Dankwort et al.

[11] Patent Number: 5,004,911
[45] Date of Patent: Apr. 2, 1991

[54] TIME MULTIPLEXED FIBER OPTIC SENSOR

[75] Inventors: Rudolph C. Dankwort; Charles D. Klem, both of Phoenix, Ariz.

[73] Assignee: Honeywell Inc., Minneapolis, Minn.

[21] Appl. No.: 368,626

[22] Filed: Jun. 20, 1989

[51] Int. Cl.$^5$ .............................................. H01J 5/16
[52] U.S. Cl. ........................... 250/227.21; 250/227.12; 250/231.19
[58] Field of Search ...................... 250/227.12, 227.14, 250/227.16, 231.10, 231.19, 227.21

[56] References Cited

U.S. PATENT DOCUMENTS

| 4,427,881 | 1/1984 | Ruell | 250/227.14 |
| 4,432,599 | 2/1984 | McMahon | 250/227.21 |
| 4,740,081 | 4/1988 | Martens et al. | 250/227.12 |
| 4,800,266 | 1/1989 | Poorman | 250/227.16 |

Primary Examiner—David C. Nelms
Attorney, Agent, or Firm—Seymour Levine

[57] ABSTRACT

An optical sensor system utilizes time multiplexing of two optical signals developed from a common light source. Relative amplitudes of the two optical signals are varied as a function of a measured parameter, time multiplexed, and coupled to a common optical transmission path. At the receiving end of the optical transmission path the two optical signals are converted to electrical signals by the same detector, thus eliminating sensitivity to source gain, interconnect fiber loss, and detector gain as sources of calibration error.

4 Claims, 3 Drawing Sheets

TIME MULTIPLEXED FIBER OPTIC SENSOR

BACKGROUND OF THE INVENTION

1. Field of the Invention

The invention pertains to the field of passive fiber optic sensors and more particularly to passive optical sensing devices for the measurement of physical parameters such as displacement, force, or pressure where the sensitive element is coupled by optical fibers from remote locations to the processing units.

2. Description of the Prior Art

There are a wide variety of passive optical sensors the modulate light intensity as a function of a physical parameter to be measured. In many applications it is desirable to locate the optical sensor at a remote location and couple it to a light source and data processing equipment via optical fibers. Sensors of this type are particularly desirable in aircraft systems wherein the light weight and freedom from electro-magnetic interference of the optical fibers are of prime importance. A requirement of these optical systems is that the sensor data not be distorted by transmission power loss in the optical fibers. Additionally, it is required that a recalibration of the system not be necessary when the passive optical sensor element, the light source, or the data receiver are replaced during normal aircraft maintenance.

In many prior art systems utilizing optical sensors, sensitivity and parameter response area primary concern and absolute value calibration is not a consideration, while in other prior art applications absolute value calibration is provided. In systems providing an absolute calibration the device is calibrated after the sensor and the optical fibers have been installed. Still other systems employing analog optical sensors utilize wavelength multiplexing of two optical signals transmitted over the same optical fiber to eliminate sensitivity to transmission and coupling losses. Such systems provide two signals at different frequencies with the ratio of the intensity of one to the intensity of the other forming the measured parameter. This intensity ratio is modulated in accordance with the physical parameter to be measured. Such multiplexing systems are complex and require two sources, one for each of the two frequencies and two detectors or filtered detector combinations. Variations in source and detector gains result in a change of signal ration and hence establish a calibration error.

A time multiplex system in the prior art is disclosed in U.S. Pat. No. 4,432,599. In this system light from a single source is coupled from a common optical fiber to two optical fibers of equal length by a directional couplers, separated by a predetermined distance along the common fiber, to be incident to a mirror attached to a physical parameter sensor and moveable in accordance with the measured parameter. The relative intensity of the light reflected to the fibers is a function of the mirror position and consequently the value of the physical parameter. Calibration of this system is dependent upon the relative attenuation of the two fibers guiding light between the common fiber and the mirror. Variations in the relative attenuation of the fibers, which may be caused by crimping one or the other during normal maintenance, seriously affects the calibration and the accuracy of the overall detection system. Additionally, the operation of the system is depending upon maintaining equal lengths for the branching optical fibers, any stretching of one relative to the other affects the time demultiplexing and may render the entire system inoperable.

SUMMARY OF THE INVENTION

A fiber optic sensor in accordance with the present invention may comprise an optical fiber coupled to a parameter sensor which deflects the optical fiber in accordance with the value of the measured parameter. A light pulse coupled to the optical fiber is divided to propagate along two separate paths with the ratio of the intensities of the light in the two paths being a function of the deflection of the optical fiber. The light pulse in one path is delayed relative to the other such that the two pulses are coupled to an output terminal in time sequence. An optical fiber coupled to the output terminal guides the two pulses to a detector whereat the amplitudes of the signals are detected and stored for subsequent processing.

In accordance with a second embodiment of the invention, a light pulse incident to an input terminal is equally divided between two optical fibers. The light in one of the fibers is time delayed but not intensity modulated, while the light in the second fiber is intensity modulated in accordance with measured parameter but not time delayed. The resulting time sequence of light pulses is coupled via an output terminal through an optical fiber for guidance to a detector whereat the pulse amplitudes of the two light pulses are detected and stored for further processing.

DESCRIPTION OF THE PREFERRED EMBODIMENT

Figure 1:
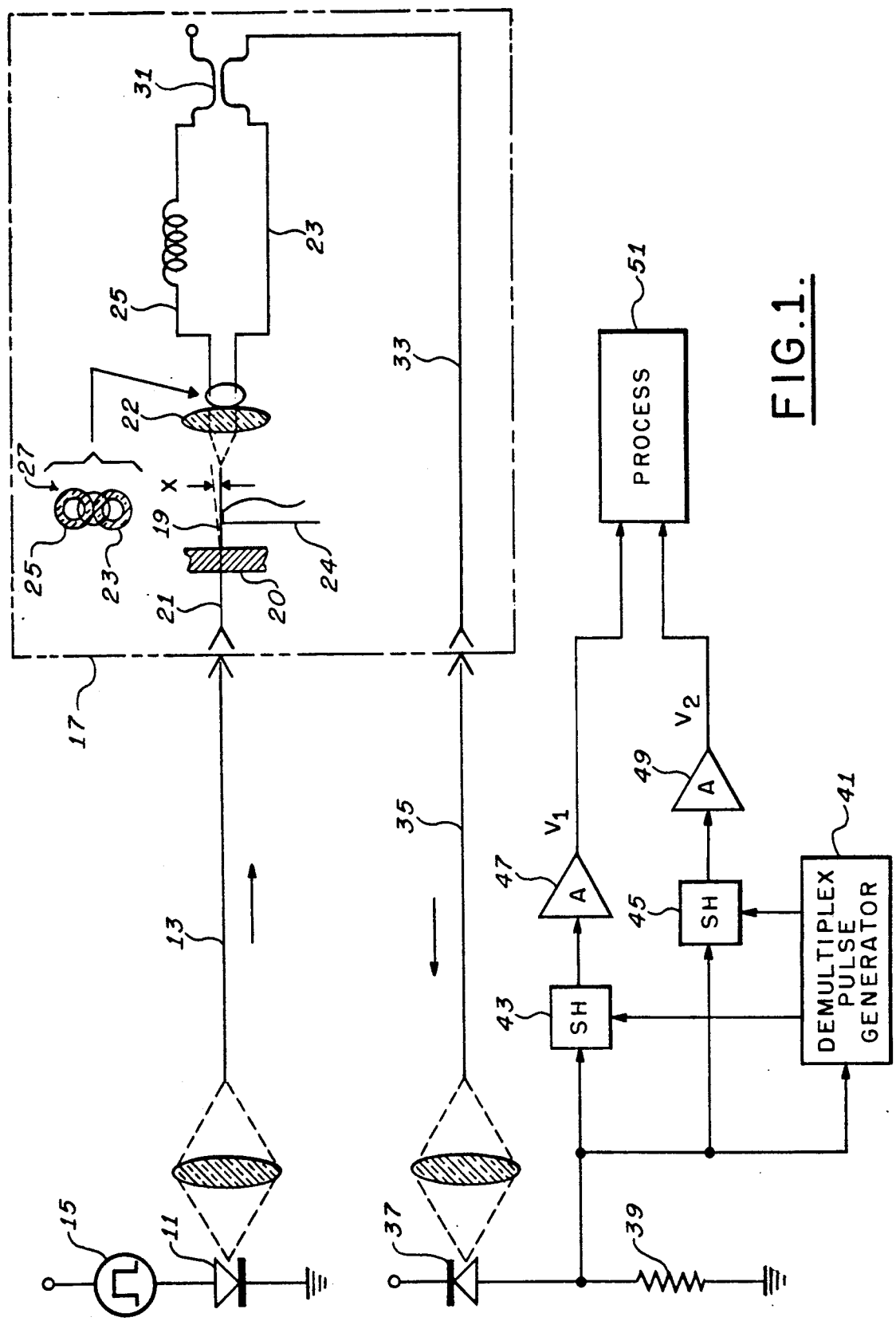
FIG. 1 is schematic diagram of a first preferred embodiment of the invention.
Figure 2:
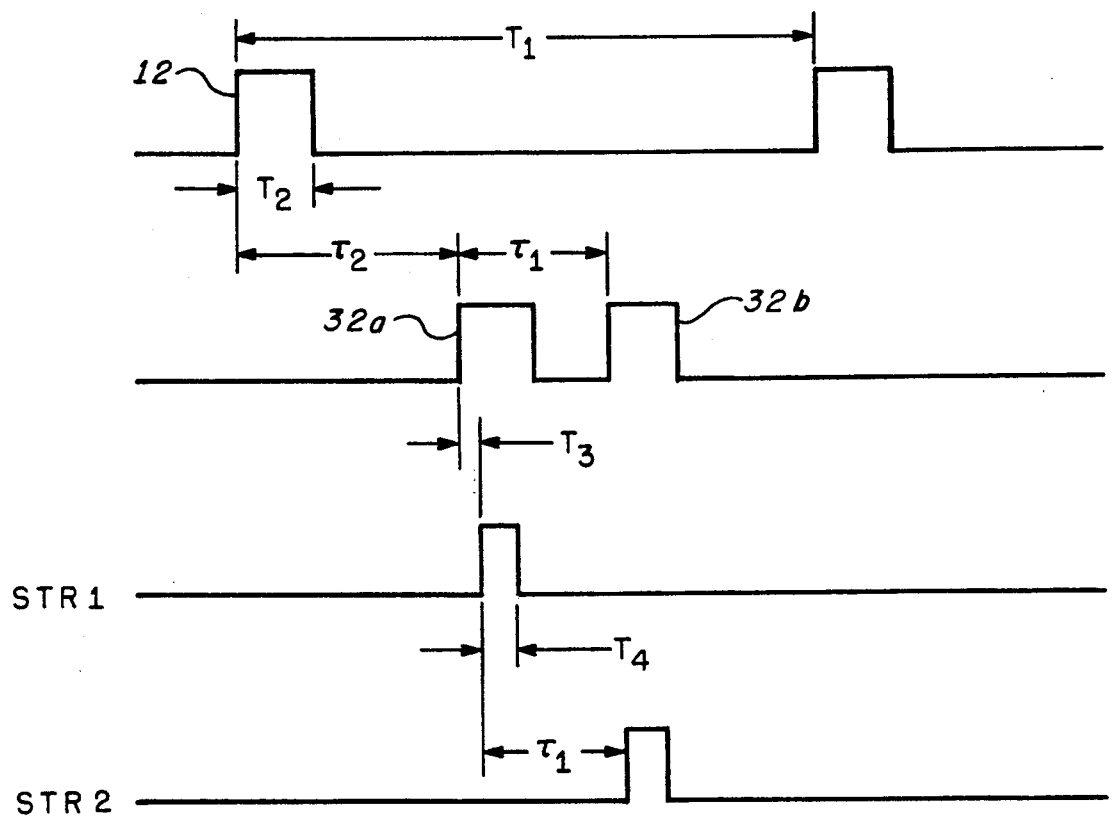
FIG. 2 is a timing diagram useful for and explaining the detection circuitry of the invention.

Referring now to FIGS. 1 and 2, there is illustrated an embodiment of the invention wherein a light emitting diode (LED) 11 launches a light pulse of duration $T_2$ into an optical fiber 13 in response to a current pulse received from a current generator 15. The optical pulse arrives at a passive analog optical sensor 17 and coupled thereat to a flexible fiber 19, one end of which is attached to a moveable member of a displacement transducer 21 which displaces the flexible fiber segment 19 in accordance with the measured parameter. Optical fibers 23 and 25 are positioned relative to a reference position of the flexible fiber 19 to receive light of equal intensity when the end of the flexible fiber 19 is at the referenced position, as indicated in the blowup 27 of the fibers 23 and 25. When the flexible fiber 19 is displaced from this referenced position by the sensor 24 light couples to the fibers 23 and 25 with unequal intensity, the relative illuminations in the fibers being a function of the direction and amplitude of the deflection.

Fiber 25 is of a substantially greater length than fiber 23. Thus, the light pulse coupled to fiber 25 will be delayed relative to the light pulse coupled to fiber 23 by $\tau_1$ seconds. The pulse on fiber 25 is coupled to the output port 29 of a directional coupler 31 at a time $\tau_1$ later than the pulse on line 23, thereby providing a sequence of two light pulses 32a and 32b with a time separation of $\tau_1$ on fiber 33. This sequence of light pulses coupled to fiber 35 and focused therefrom to PIN diode 37 wherefrom two current pulses are coupled to a resistor 39. The first light pulse 32a arrives at the PIN diode 37 at a time $\tau_2$ after the generation of the light pulse by the LED diode that is equal to the time required for light to propagate through the serially connected optical fibers 13, 23, 33, and 35. Similarly, the second light pulse 32b arrives at diode 37 at a time $\tau_1$ after the light pulse 32a in consequence of having traversed fibers 13, 25, 33, and 35.

Current pulses from PIN diode 37 develop voltages across the load resistor 39 that replicate the amplitude and shape of the optical pulses incident to PIN diode 37. The leading edge of a first electrical pulse developed across resistor 39 activates a demultiplexer-pulse generator 41, yet to be described. Strobe pulses from demultiplexer-pulse generator 41 activate sample and hold circuits 43 and 45 which respectively sample the voltages at the centers of the voltage pulses. These sampled values are buffered by linear amplifiers 47 and 49 which respectively provide voltages $V_1$ and $V_2$ which are coupled to a processor 51 for further processing.

Since the voltages V1 and V2 replicate the light pulses to the fibers 23 and 25, a displacement of $\Delta x$ may be computed as a function of the sum and difference of the voltages coupled to the processor 51 from the buffer amplifiers 47 and 49. The processor 51 may perform arithmetic operations necessary to provide a ratio of the difference of the voltages to the sum of the voltages, $(V_1-V_2)/(V_1+V_2)$, and thereafter may compute the value of the ratio $V_1/V_2$.

Characteristics of the remote sensor 17 components that affect calibration, such as sensor voltages and optics, the transmission losses in the optical fibers 23 and 25, and the coupling ratio and parasitic losses of the directional coupler 31, are stable parameters that may be adjusted or calibrated at the time of manufacture. Additionally, gain characteristics of the sample and hold circuits 43, 45, and the buffer amplifiers 47, and 49 must be held to close tolerances to avoid calibration errors. These characteristics, however, are very stable and can be closely matched by a calibration that is independent of the remote optic sensor with which they are to be used. It is important to note that the accuracy of the measurement is independent of attenuation variations in the optical fibers 13, 35 leading to and from the remote sensor 17.

The timing sequence for operation of the remote sensor 17 may be explained with references to FIGS. 1 through 4. Referring to FIGS. 1 and 2 light pulses are generated by the LED having a pulse width $T_2$ in a time interval $T_1$. Responsive to each of these light pulses the passive optic sensor 17 generates a pair of sequential light pulses, the first of which arrives at the PIN diode 37 at a time $\tau_2$ established by the total optical path length from LED 11 through the undelayed branch of the optical sensor 17 to the PIN diode 37. The pulses are separated by a time interval $\tau_1$ established by the delay in the optical fiber 25. Two strobe pulses STR1 and STR2, generated in response to the leading edges of the pulses in the two pulse sequence by the demultiplex-pulse generator 41, control the sample and hold switching of the voltage developed across the resistor 39 into the buffer amplifiers 47, 49.

Figure 3:
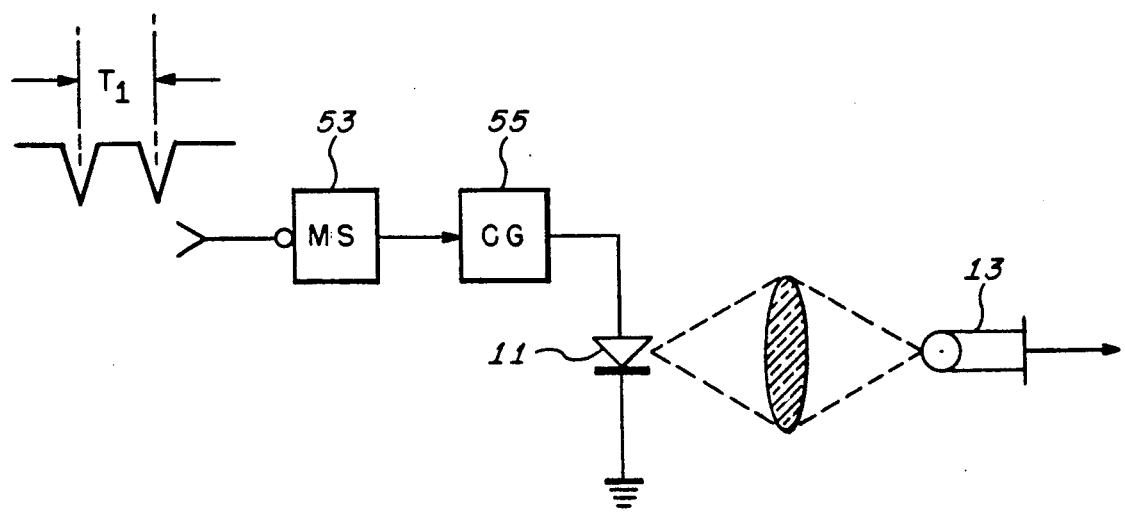
FIG. 3 is a schematic diagram of a pulsed light source.

Refer now to FIG. 3 wherein a generating circuit for the optical source signal is presented. A digital clock, not shown, provides narrow pulses with a time interval $T_1$ seconds there between that trigger a monostable multi-vibrator (MS) 53 to enable a current pulse generator (CG) 55 wherefrom a pulse having a width $T_2$ seconds is coupled to the LED 11, wherefrom a light pulse of duration $T_2$ is coupled to the optical fiber 13. The interpulse period $T_1$ is set to a value which permits the reception of the sequence of the two light pulses before a subsequent pulse is generated by the LED 11.

Figure 4:
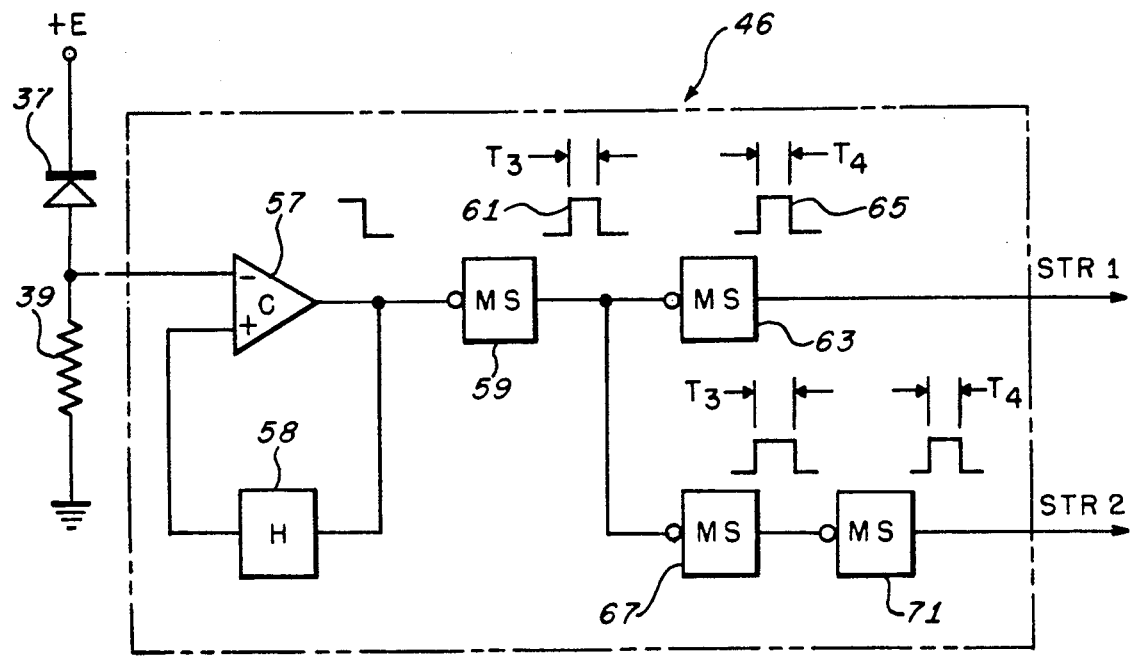
FIG. 4 is a schematic diagram of a time demultiplexing electronic circuit.

Referring now to FIG. 4 with continued reference to FIG. 1. The electrical pulse developed across the resistor 39 is coupled to the inverting terminal of a comparator 57 which is initially in a high level state. When the leading edge of the electrical pulse achieves a predetermined level the comparator is switched to a low level state providing a falling edge which triggers a monostable multi-vibrator (MS) 59. Nuisance tripping of the comparative 57 is avoided by a feedback through a well known hysteresis circuit 58 to the non-inventing terminal of the comparative 57. The transition from the low to high state of the comparator triggers a monostable multivibrator (MS) 59 to generate a pulse 61 of duration $T_3$ having a falling edge approximately at a time that coincides with the center of the first voltage pulse in the two voltage pulse sequence. Responsive to the falling edge of the pulse 61 a monostable multi-vibrator 63 generates a pulse 65 of duration $T_4$ so that the pulse 65 which constitutes the first strobe pulse, enables the first sample and hold circuit 43 at a time corresponding to the center of the leading pulse of the two pulse sequence developed across the resistor 39. The falling edge of pulse 61 also triggers a monostable vibrator 67 to generate a pulse 69 of duration $\tau_1$. The trailing edge of pulse 69 triggers still another monostable multi-vibrator 71 which provides a second pulse of duration $T_4$ as the second strobe pulse, thus enabling the sample and hold circuit 45 at a time coincident with the center of the second voltage pulse in the sequence of two voltage pulses. It should be recognized that without proper precaution the comparator 57 may generate a second trailing edge in response to the second pulse in the two pulse sequence.

In FIG. 1 the input fiber 21 of the passive optic analog sensor 17 is rigidly supported at a suitable clamping point 20, while the end of the fiber 19 is displaced in accordance with the value of the physical displacement. Light emitted at the end of the displaced fiber 19 is focused by a lens 22 to the fibers 23 and 25. The fibers 23 and 25 are positioned relative to the fiber 19 such that the intensity of the light coupled into these fibers is equal at zero displacement of the fiber 19 and varies linearly in each fiber as a function of the displacement x from the reference position. The intensities of the light $I_5$ and $I_3$ of the light respectively coupled to the fibers 23 and 25 as a function of the displacement x are given by $$I_5 = I_0 + k_1 x \qquad (1)$$

$$I_3 = I_0 - k_1 x \qquad (2)$$

where $I_0$ is the light intensity coupled to both fibers at zero displacement and $k_1$ is a constant having dimensions of intensity per unit displacement. Since $I_0$ and $k_1$ are functions of the light intensity $I_2$ in the optical fiber 13 and a coupling factor between the optical fiber 13 and the optical fiber 19, these factors may be incorporated into equations 1 and 2 to provide $$I_5 = I_2(k_2 + k_3 x) \quad (3)$$

$$I_3 = I_2(k_2 - k_3 x) \quad (4)$$

where $k_2$ is a dimensionless constant $k_3$ is a constant having dimensions of reciprocal unit length. The voltages $V_1$, $V_2$ at the output of the amplifiers 47 and 49, respectively, are related to these intensities by a common conversion factor $k_4$. This is due to the fact that the light pulses of the two light pulse sequence from the output port 29 of the directional coupler 31 propagate through the same optical fibers 33 and 35, pulses are detected by the same PIN diode 37 to develop the two voltages, and that the gain of the two amplifiers 47 and 49 are substantially equal. Consequently the voltages at the output terminals of the amplifiers are $$V_2 = k_4 I_2(k_2 + k_3 x) \quad (5)$$

$$V_1 = k_4 I_2(k_2 - k_3 x) \quad (6)$$

It should be apparent from equations 5 and 6 that the displacement x may be determined from $$x = (k_2/k_3)(1-r)/(1+r) \quad (7)$$

where r is the ratio $V_1/V_2$.

It should be recognized that sensor embodiments other than that described above may be utilized with time multiplexing to establish the relationship between a voltage ratio and a deflection x. It should also be recognized that the deflection x may be produced by physical parameters such as force, pressure, and acceleration in combination with a suitable spring. Further, the optic system that produces the light intensity variation expressed in equation 1 and 2 take many forms. One such form may utilize variable coupling ratio beam splitters which split an incident light beam to propagate in two paths with the intensity in each path being a function of the applied stress or voltage.

Figure 5:
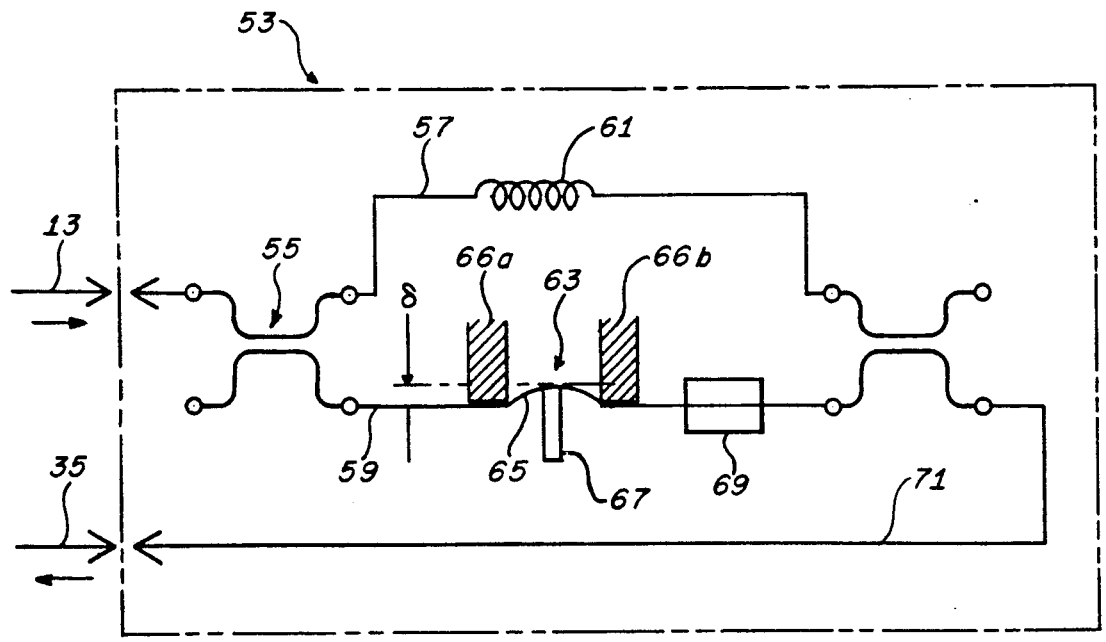
FIG. 5 is a schematic diagram of a second preferred embodiment of the invention.

Refer now to FIG. 5 wherein a second preferred embodiment of a senor is shown. A light beam with intensity $I_2$ incident to the sensor 72 from the optical fiber 13 is divided by a 3 dB fiber optical coupled 73 to propagate in fibers 74 and 75 with equal intensities. The light pulse in fiber 74 is coupled to a fiber optic delay line 76 wherein it is delayed by $\tau_1$ seconds and emerges therefrom at an intensity substantially equal to that at the input of the delay line. The light beam in fiber 75 is coupled to a variable attenuator 78 wherein the intensity is modulated by bending an optical fiber 77. This fiber is attached to two supports 77a, 77b, and coupled to a plunger 79 positioned between the supports which bends the fiber as a function of an applied force, thus causing light from the fiber core to be coupled into the fiber cladding where it is absorbed by a suitable cladding mode stripper 81. The delayed attenuated light beams ar then recombined into a single optical fiber 82 and coupled therefrom to the optical fiber 35 to propagate to the pin diode 37 (FIG. 1). Assuming a loss in the attenuator 78 that is linearly proportional to displacement, the displacement $\delta$ may be determined from $$\delta = (k_5/k_6)(1-r) \quad (8)$$

where $k_5$ is a dimensionless proportionality constant, $k_6$ is a proportionality constant having dimensions of reciprocal distance, and r is the ratio $V_1/V_2$ of the attenuated to the time delayed pulse amplitudes. The ratio r, as before, is independent of gain variations in the light source, detector, and attenuations of the fibers 13 and 15 that couple light to and from the sensor 72. Equation 8 is typical of a class of sensors that, with the aid of polarization filters, have transmission gains that very as a function of stress applied to a birefringent optical element and a class of optical sensors wherein fiber optic transmission loss is varied by changing the bend radius of the fiber.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. A fiber optic sensor comprising:
   means for receiving optical signals from a first light propagation path;
   means coupled to said receiving means for deflecting said receiving means for a reference position in accordance with a measured parameter, thereby providing a deflected optical signal;
   delay means responsive to said deflected optical signal for providing first and second optical signals with a time delay interval therebetween, said first and second optical signals having relative intensities that are functions of said measured parameter; and
   means for coupling said first and second optical signals to propagate along a second light propagation path.

2. A fiber optical sensor in accordance with claim 1 wherein said delay means comprises:
   first and second optical fibers positioned relative to said reference position such that said deflected optical signal couples light into each at intensities that vary in accordance with deflections of said optical signal from said reference position; and
   means coupled to one of said first and second optical fibers for providing a time delay to optical signals therein.

3. A fiber optic sensor in accordance with claim 1 further including:
   means coupled to said second propagation path for converting light beams incident thereto to electrical signals, thereby providing first and second electrical signals respectively corresponding to said first and second optical signals;
   means responsive to a first received electrical signal for providing a trigger signal;
   means responsive to said trigger signal for providing first and second pulses of equal time duration having a time interval therebetween; and
   means coupled to receive said first and second electrical signals and responsive to said first and second pulses for providing signals representative of amplitudes of said first and second electrical signals; and
   means responsive to said representative signals for determining deflections from said reference position.

4. A parameter sensing apparatus comprising:

means for dividing a received optical signal to propagate along first and second optical paths;
first means respectively coupled to said first optical path for providing a time delay to optical signals propagating therein, thereby providing time delayed optical signals;
second means respectively coupled to said second optical path for attenuating optical signals propagating therethrough in accordance with values of a sensed parameter, thereby providing attenuated optical signals; and
means coupled to said first and second means for coupling said delayed optical signals and said attenuated optical signals to propagate along a common optical path.

* * * * *